(12) United States Patent
Lehmann et al.

(10) Patent No.: US 11,982,072 B2
(45) Date of Patent: May 14, 2024

(54) WALL INSTALLATION CONNECTION BOX UNIT WITH A FUNCTIONAL SURFACE BODY

(71) Applicant: Hansgrohe SE, Schiltach (DE)

(72) Inventors: Günther Lehmann, Oberwolfach (DE); Jürgen Schorer, Schiltach (DE)

(73) Assignee: Hansgrohe SE, Schiltach (DE)

( * ) Notice: Subject to any disclaimer, the term of this patent is extended or adjusted under 35 U.S.C. 154(b) by 427 days.

(21) Appl. No.: 17/209,877

(22) Filed: Mar. 23, 2021

(65) Prior Publication Data

US 2021/0301507 A1  Sep. 30, 2021

(30) Foreign Application Priority Data

Mar. 24, 2020  (DE) .................... 10 2020 203 794.9

(51) Int. Cl.
*E03B 7/09* (2006.01)
*H02G 3/06* (2006.01)
*H02G 3/10* (2006.01)

(52) U.S. Cl.
CPC ........... *E03B 7/095* (2013.01); *H02G 3/0616* (2013.01); *H02G 3/10* (2013.01)

(58) Field of Classification Search
CPC ........ E03B 7/095; H02G 3/0616; H02G 3/10; H02G 3/12; H02G 3/185; E03C 1/021; E03C 1/0401; E03C 1/02; F16L 41/00
(Continued)

(56) References Cited

U.S. PATENT DOCUMENTS 1,822,056 A  9/1931  Noble
2,297,862 A  10/1942  Bachmann
(Continued)

FOREIGN PATENT DOCUMENTS

AT  507052 A1  1/2010
AT  517356   1/2017
(Continued)

OTHER PUBLICATIONS

Translation of Chinese Office Action from the National Intellectual Property Administration, 4 pages.
(Continued)

*Primary Examiner* — Muhammad Ijaz
(74) *Attorney, Agent, or Firm* — Bose McKinney & Evans LLP

(57) ABSTRACT

A wall installation connection box unit including a box housing body having a rear-side base portion and a sleeve portion projecting forward from the base portion, which sleeve portion peripherally surrounds a sanitary component mounting space, which space is accessible via an open front end face of the sleeve portion, a functional surface body including a functional surface, and a connection device which is configured for releasable fastening of the functional surface body to the base portion in different axial levels of the functional surface and includes at least one connection structure on the base portion radially outside the sleeve portion and a connection body cooperating with the connection structure, which connection body is user-operable via an actuation interface to be movable relative to the connection structure and to the functional surface body between a released position and a fastened position. Illustratively, the actuation interface of the connection body is located on a side of the functional surface body facing away from the base portion of the box housing body or the actuation interface, or the connection body is rotatable between the released position and the fastened position, or the connection device is configured for selective releasable fastening of the functional surface body in front of a front side or behind a rear side of the base portion of the box housing body.

13 Claims, 4 Drawing Sheets

(58) Field of Classification Search
USPC .................................................. 248/65, 70
See application file for complete search history.

(56) References Cited

U.S. PATENT DOCUMENTS

| | | | |
|---|---|---|---|
| 4,181,329 A | 1/1980 | Helm | |
| 4,265,265 A | 5/1981 | Wallace | |
| 4,265,365 A | 5/1981 | Boteler | |
| 5,046,521 A | 9/1991 | Jensen | |
| 5,368,065 A | 11/1994 | Humpert | |
| 5,783,774 A | 7/1998 | Bowman et al. | |
| 5,913,439 A | 6/1999 | Von Arx | |
| 5,934,032 A | 8/1999 | Oberdorfer | |
| 6,499,771 B1 | 12/2002 | Snyder, Sr. | |
| 6,547,285 B1 | 4/2003 | Schoenweger et al. | |
| 6,992,252 B1 | 1/2006 | Rao | |
| 7,462,775 B1* | 12/2008 | Gretz ................ H02G 3/16 174/64 | |
| 7,523,837 B2 | 4/2009 | Schoenweger | |
| 8,158,884 B2 | 4/2012 | De la Borbolla | |
| 8,398,122 B2 | 3/2013 | Crompton | |
| 8,459,301 B2 | 6/2013 | Lorch | |
| 8,899,431 B1 | 12/2014 | Shotey et al. | |
| 9,086,179 B1 | 7/2015 | Komolrochanaporn | |
| 10,280,598 B2 | 5/2019 | Tzeng | |
| 10,745,894 B2 | 8/2020 | Colombo | |
| 10,889,968 B2 | 1/2021 | Philipps et al. | |
| 11,451,029 B2 | 9/2022 | Tseng et al. | |
| 2004/0050423 A1 | 3/2004 | Schoenweger | |
| 2005/0194785 A1 | 9/2005 | Shemtov | |
| 2005/0251908 A1* | 11/2005 | Doverspike ......... E03C 1/021 4/695 | |
| 2011/0101673 A1 | 5/2011 | Kern-Emmerich et al. | |
| 2011/0309611 A1 | 12/2011 | Smith | |
| 2012/0284994 A1 | 11/2012 | Crompton | |
| 2013/0334220 A1 | 12/2013 | Sohler | |
| 2015/0259891 A1 | 9/2015 | Iamert et al. | |
| 2016/0352087 A1* | 12/2016 | Wurms ............... H02G 3/081 | |
| 2017/0002551 A1 | 1/2017 | Zhou | |
| 2017/0152979 A1 | 6/2017 | Klein et al. | |
| 2017/0152980 A1 | 6/2017 | Klein et al. | |
| 2017/0256930 A1 | 9/2017 | Wurms | |
| 2018/0003329 A1 | 1/2018 | Sochtig et al. | |
| 2018/0017197 A1 | 1/2018 | Meister et al. | |
| 2018/0073223 A1 | 3/2018 | Colombo | |
| 2018/0123332 A1 | 5/2018 | Laukhuf | |
| 2018/0266606 A1 | 9/2018 | Meister et al. | |
| 2018/0274705 A1 | 9/2018 | Meister et al. | |
| 2019/0107234 A1 | 4/2019 | Corbett et al. | |
| 2019/0134524 A1 | 5/2019 | De Wilde | |
| 2019/0219170 A1 | 7/2019 | Gandolfo et al. | |
| 2019/0338498 A1* | 11/2019 | Luig ................ E03C 1/021 | |
| 2019/0338499 A1* | 11/2019 | Philipps .............. E03C 1/021 | |
| 2021/0301507 A1* | 9/2021 | Lehmann ........... H02G 3/0616 | |
| 2021/0301508 A1* | 9/2021 | Grob .................. E03C 1/021 | |
| 2021/0305793 A1 | 9/2021 | Lehmann et al. | |
| 2021/0305796 A1* | 9/2021 | Blattner ............... H02G 3/081 |

FOREIGN PATENT DOCUMENTS

| | | |
|---|---|---|
| CH | 681237 A5 | 2/1993 |
| CN | 204732809 | 10/2010 |
| CN | 102057205 A | 5/2011 |
| CN | 203589341 U | 5/2014 |
| CN | 106195376 A | 12/2016 |
| CN | 106461141 A | 2/2017 |
| CN | 107620846 A | 1/2018 |
| CN | 108290079 A | 7/2018 |
| CN | 108626505 A | 10/2018 |
| CN | 208461082 U | 2/2019 |
| CN | 109630785 A | 4/2019 |
| CN | 209388954 U | 9/2019 |
| CN | 110557957 A | 12/2019 |
| CN | 114498493 A | 5/2022 |
| DE | 2637719 | 2/1978 |
| DE | 3310138 A1 | 10/1984 |
| DE | 3907588 A1 | 9/1990 |
| DE | 4417485 C2 | 8/1997 |
| DE | 19715651 | 10/1998 |
| DE | 19856156 A1 | 6/2000 |
| DE | 20105345 | 7/2001 |
| DE | 10036996 | 1/2002 |
| DE | 10122022 | 11/2002 |
| DE | 10233858 A1 | 1/2004 |
| DE | 102004060744 A1 | 6/2006 |
| DE | 20321431 U1 | 4/2007 |
| DE | 102007002235 | 7/2008 |
| DE | 102007044284 | 3/2009 |
| DE | 102008064253 B3 | 2/2010 |
| DE | 202009014967 | 2/2010 |
| DE | 102009012838 | 8/2010 |
| DE | 102009049711 A1 | 4/2011 |
| DE | 102012203393 | 9/2013 |
| DE | 202014106179 U1 | 3/2015 |
| DE | 102015112420 | 2/2017 |
| DE | 102014208291 | 2/2018 |
| DE | 102017100707 A1 | 7/2018 |
| DE | 102017100710 | 7/2018 |
| DE | 102017127151 | 5/2019 |
| EP | 424690 | 5/1991 |
| EP | 0546288 A1 | 6/1993 |
| EP | 1006244 B1 | 6/2000 |
| EP | 1256662 | 11/2002 |
| EP | 1355399 A1 | 10/2003 |
| EP | 1382757 A1 | 1/2004 |
| EP | 1382757 B1 | 8/2007 |
| EP | 2101002 | 9/2009 |
| EP | 2226432 A2 | 9/2010 |
| EP | 2468966 | 10/2013 |
| EP | 2822121 | 1/2015 |
| EP | 2636803 B1 | 10/2017 |
| EP | 3486380 | 5/2019 |
| EP | 3570396 | 11/2019 |
| GB | 622374 A | 5/1949 |
| GB | 2337287 A | 11/1999 |
| JP | 2002374613 A | 12/2002 |
| NO | 336337 | 8/2015 |
| PL | 183459 B1 | 5/1998 |
| RU | 2518469 C2 | 6/2014 |
| WO | 03081054 A1 | 10/2003 |
| WO | 2010069606 A1 | 6/2010 |
| WO | WO2015166084 | 11/2015 |
| WO | 2016147042 A1 | 9/2016 |
| WO | 2017091839 A1 | 6/2017 |

OTHER PUBLICATIONS

Translation of Chinese Search Report from the National Intellectual Property Administration, 3 pages.
Decision on Granting issued by the Patent Office in the Russian Federation on Nov. 24, 2021 (including English language translation), 19 pages.
Office Action in German Language issued by the German Patent Office, Munich, dated Feb. 16, 2021, for German Patent Application No. 10202203794.9, 7 pages.
Office Action issued by the National Intellectual Property Administration, P.R. China, dated Jul. 25, 2022 for Chinese Patent Application No. 202110312452.3 (Chinese and English Language), 6 pages and 5 pages, respectively.
Office Action issued by the National Intellectual Property Administration, P.R. China, dated Jul. 25, 2022 for Chinese Patent Application No. 202110312440.0 (Chinese Language), 8 pages.
Office Action issued by the National Intellectual Property Administration, P.R. China, dated Aug. 8, 2022 for Chinese Patent Application No. 202110312348.4 (Chinese and English Language), 14 pages.

* cited by examiner

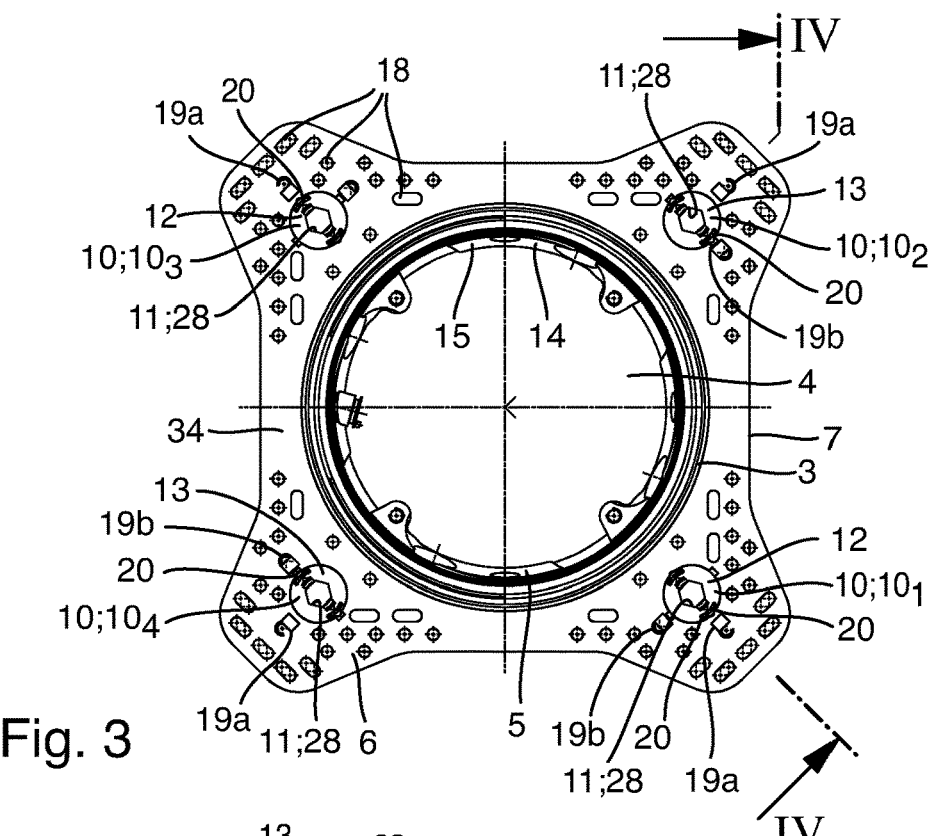
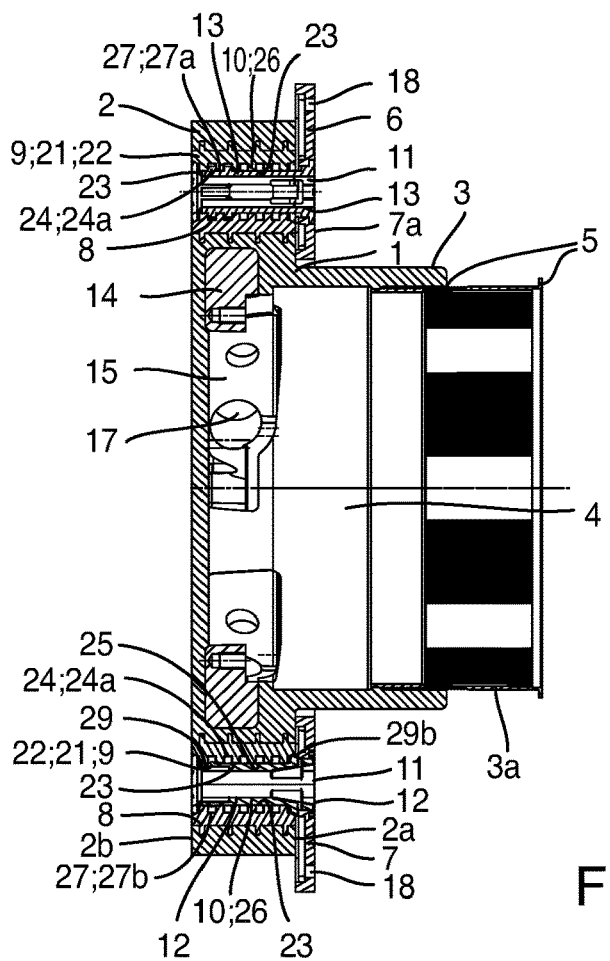

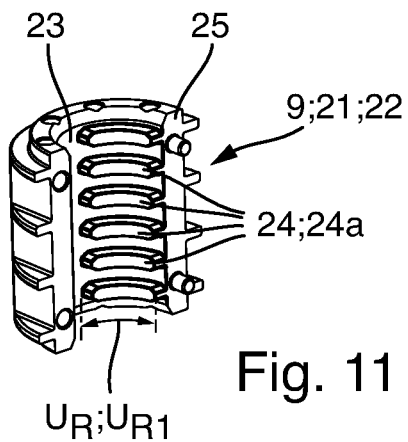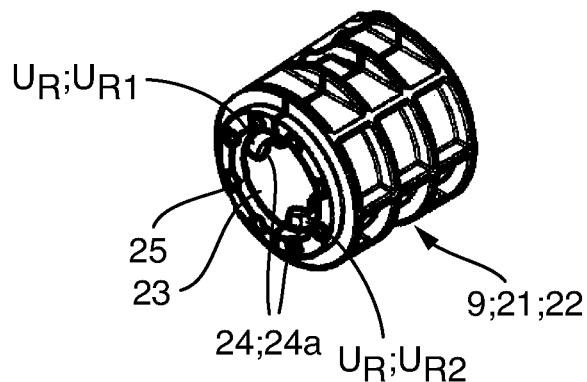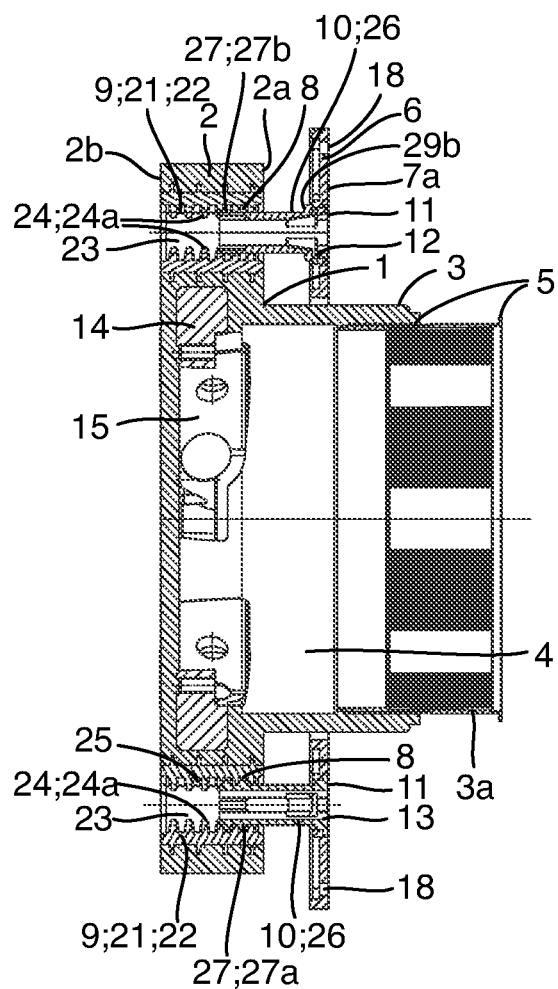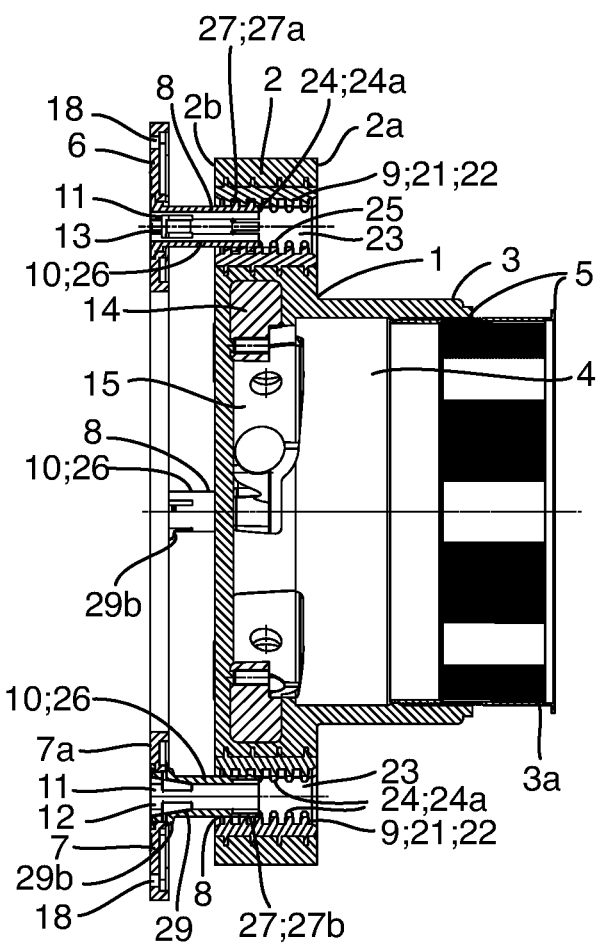

WALL INSTALLATION CONNECTION BOX UNIT WITH A FUNCTIONAL SURFACE BODY

CROSS-REFERENCE TO RELATED APPLICATION

This application claims priority to German Patent Application No. DE 10 2020 203 794.9, filed on Mar. 24, 2020, the disclosure of which is expressly incorporated herein by reference.

BACKGROUND AND SUMMARY OF THE DISCLOSURE

The invention relates to a wall installation connection box unit, including a box housing body, which includes a rear-side base portion and a sleeve portion projecting forward from the base portion, a functional surface body including a functional surface, and a connection device which is configured for releasable fastening of the functional surface body to the base portion in different axial levels of the functional surface and includes at least one connection structure on the base portion radially outside the sleeve portion and a connection body cooperating with the connection structure, which connection body is arranged to be user-operable via an actuation interface and to be movable relative to the connection structure and to the functional surface body between a released position and a fastened position. The sleeve portion peripherally surrounds an installation component mounting space, which space is accessible via an open front end face of the sleeve portion.

Connection box units of this type are used, for example, in sanitary installation technology for connecting installation components in the form of sanitary components, such as water outlet fittings for washbasins, bathtubs, showers or kitchen sinks, or sanitary thermostat, mixer and/or shut-off valve units mounted upstream, to water conduit connections pre-installed in the building, and, in electrical installation technology, for connecting electrical installation components, such as sockets, junction boxes, sensors, actuators, light switches, etc., to electrical conduit connections pre-installed in the building. Typical in this context are especially flush-mounted designs in which the wall installation connection box unit is installed in the relevant building wall in such a manner that it ends on the front side in as flush a manner as possible with the finished building wall surface, for example a plastered wall surface or a tiled wall surface. It is understood that the building wall in this case can be either a vertical building wall in the narrower sense or a bottom wall or bottom surface or a top wall or top surface of a building or of a room, for example of a shower room, a bathroom, a toilet room, a kitchen, etc., in the sanitary case.

A connector body which is arranged in the base portion of the box housing body conventionally acts as a connecting link for connecting the installation component to the conduit connections in the building, wherein the base portion is correspondingly designed for the arrangement or retaining of the connector body. The connector body includes an installation component connection contour facing the installation component mounting space, and a conduit connection interface structure accessible on an outer side of the box housing body.

The conduit connection interface structure typically includes one or more connection interfaces: in the sanitary case, a fluid conduit connection interface structure in particular in the form of corresponding pipe conduit connection ports for coupling to a corresponding pipe conduit connection port in the building, for example for cold water, hot water or mixed water mixed from cold water and hot water; in the electrical case, an electrical conduit connection interface structure, in particular in the form of cable conduit connections.

The installation component connection contour of the connector body, in the sanitary case a sanitary component connection contour and, in the electrical case, an electrical component connection contour, is designed to interact with a corresponding connection contour of an installation component to be coupled, such as a mixing unit and/or shut-off valve unit or a water outlet fitting in the sanitary case, or an electrical installation component in the electrical case. In the sanitary case, the connector body includes a fluid channel structure for fluidly connecting the fluid conduit connection interface structure on the outer side of the box to the sanitary component connection contour on the inner side of the box, and, in the electrical case, includes an electrically conductive connection of the electrical conduit connection interface structure on the outer side of the box to the electrical component connection contour on the inner side of the box.

The connection box unit is inserted with its rear side or a rear-side bottom in front into a building wall opening or placed on a building wall, for example on a wall produced in a dry construction, wherein the required conduit connections between the connections in the building on the one hand and the connection interface structure of the connector body on the other hand are made. After completion of the wall, the installation component can then be introduced into the mounting space of the box housing body via the open front end face of the box housing body and coupled to the matching connection contour of the connector body.

The functional surface body, which can be formed integrally or from a plurality of individual components, provides with its functional surface a surface which meets a function conceived for it, for example a fastening function and/or a sealing function. The functional surface can thus be used, for example, to fasten the functional surface body, and thereby the box housing body, to the base portion of which the functional surface body is fastened, to a wall in the building, as mentioned above in the sanitary case, for example, to a side wall, top wall or bottom wall of a bathroom, a shower room, a toilet room, another sanitary room, a kitchen, etc.

The correspondingly configured connection device enables the functional surface body to be fastened releasably to the base portion in different axial levels of its functional surface, as a result of which the functional surface can be provided variably at an optimum axial level for the particular application, for meeting the function conceived for it, for example in order, at the relevant axial level, to provide a fastening surface for fastening the connection box unit or the box housing body thereof to a wall surface in the building and/or a sealing surface for sealing the connection box unit in relation to a wall surface in the building.

Via the actuation interface, the user can move the connection body between the released position and the fastened position and thereby fasten the functional surface body to the base portion of the box housing body or enable same again to release it. The actuation interface is suitably designed for actuation by the user, for example for actuation without a tool or with the use of an actuation tool and an associated tool interface profile on the actuation interface.

Various related types of sanitary wall installation connection box units are known, in which the functional surface body is formed by a plurality of fastening flanges which are integrally formed projecting radially outward on the base portion, in a bottom region thereof, and have fastening lugs which can be used to fasten the box housing body on the base of a recess in a wall. Patent publications EP 1 006 244 B1 and EP 2 636 803 B1 and laid-open publications DE 10 2004 060 744 A1 and WO 2017/091839 A1 disclose corresponding embodiments in the form of sanitary wall installation connection box units, wherein the last-mentioned laid-open publication additionally discloses the option of the embodiment in the form of an electrical wall installation connection box unit. Wall installation connection box units of the type in question, i.e. those of the type mentioned at the outset, differ therefrom by their capability of being able to releasably fasten the functional surface body to the base portion in different axial levels of the functional surface.

Patent publication EP 1 382 757 B1 discloses related types of sanitary wall installation connection box units, in which the functional surface body is a closed annular body which acts as a fastening flange annularly surrounding the sleeve portion of the box housing body and can be fastened to the sleeve portion in different axial levels by a screw or bayonet connection, or is provided with axially protruding, dowel-like catches which can be pushed into fastening lugs, which protrude radially from the base portion on the bottom region thereof, and can be locked to said fastening lugs at different axial levels.

Laid-open publication DE 10 2004 060 744 A1 discloses a further related type of sanitary wall installation connection box unit, in which a sealing tab acts as a functional surface body, the sealing tab being integrally formed on the sleeve portion in a manner protruding radially outward in the region of the open front end face, and providing a sealing surface for sealing the sanitary component mounting space in relation to the building wall, wherein the sleeve portion of the box housing body is formed by a bellows, by means of which the sealing tab can be placed in a variable axial level relative to the base portion of the box housing body.

Laid-open publication DE 10 2017 100 707 A1 discloses a sanitary wall installation connection box unit of the type in question, in which an integral fastening frame that annularly surrounds the sleeve portion acts as a functional surface body, and the connection device includes, as connection body, spring tongues protruding axially from the fastening frame and associated securing clips, and, as connection structure, locking regions on the outer periphery of the base portion of the box housing body, the locking regions cooperating releasably with the spring tongues. The fastening frame is pushed over the sleeve portion of the box housing body until its spring tongues are locked to the locking regions at a desired axial level. The securing clips are retained captively on clip guides of the fastening frame and can be actuated by the user by the latter pressing radially inward on an operator control surface, which acts as actuation interface, of the securing clips and displacing the securing clips axially between an installation position unlocking the locking connections and a securing position locking the locking connections, which is facilitated by an anti-slip ribbing of the radially outwardly facing operator control surface.

In a further sanitary wall installation connection box unit of the type in question that is disclosed in laid-open publication WO 2010/069606 A1, the functional surface body is formed in multiple parts by a respective fastening surface on a head part of a plurality of retaining feet that can be fitted with a foot part into mounting openings on the outer periphery of the base portion of the box housing body, preferably in corner regions of same, and can be fixed at different axial levels such that the box housing body or the connection box unit can be fastened on a wall in the building with the aid of said fastening surfaces. In order to achieve a preliminary fixing, the pushing of the retaining feet into the mounting openings can be designed so as to lock. In order to fix the retaining feet at the desired axial height in the mounting openings, a fixing clip is in each case releasably inserted radially from the outside into suitable grooves in the retaining feet. In the case of this connection device, the mounting openings in this manner act as the connection structure, with which the foot parts of the retaining feet and the fixing clips, as the connection body, cooperate, wherein the radially outer side of the fixing clips acts as an actuation interface at which the respective fixing clip can be grasped by the user in order to displace same in radial direction between its unlocking released position and its locking fastened position.

It is an object of the invention to provide a wall installation box connection unit of the type mentioned at the outset which in particular provides functional advantages and/or advantages in respect of the outlay on manufacturing and/or installation in comparison to the above-mentioned prior art.

The invention achieves this and other objects by providing a wall installation connection box unit which includes a box housing body having a rear-side base portion and a sleeve portion projecting forward from the base portion, a functional surface body including a functional surface, and a connection device which is configured for releasable fastening of the functional surface body to the base portion in different axial levels of the functional surface and includes at least one connection structure on the base portion radially outside the sleeve portion and a connection body cooperating with the connection structure, which connection body is arranged to be user-operable via an actuation interface and to be movable relative to the connection structure and to the functional surface body between a released position and a fastened position. The sleeve portion peripherally surrounds an installation component mounting space, which space is accessible via an open front end face of the sleeve portion.

According to one aspect of the invention, the actuation interface of the connection body is located on a side of the functional surface body facing away from the base portion of the box housing body. This makes it advantageously possible for the user to actuate the connection body, and therefore the connection device, on the side of the functional surface body facing away from the base portion, in order to fasten the functional surface body to the base portion and to release same again when required, or to fasten it at another axial level on the base portion.

In the typical applications of the connection box unit, the functional surface body is comparatively easily accessible from this side for the user, for moving the connection body between its released position and its fastened position. In particular, this side of the functional surface body is generally also still accessible to the user once the connection box unit has been introduced into a wall opening in the building or has been arranged on a wall in the building. This enables the user, for example, to adjust an axial level of the box housing body relative to a building wall even if the box housing body has already been arranged on the building wall or attached to the latter via the functional surface body. In addition, it is advantageous that the base portion of the box housing body is no hindrance to the actuation of the connection body by the user via the actuation interface since the base portion and the actuation interface are located on opposite sides of the functional surface body.

According to a further aspect of the invention, the connection body is rotatable between the released position and the fastened position. For corresponding applications, this constitutes an advantageous manner of movement for the connection body in combination with the other specific features of the connection device. The rotatability can be realized for the connection body with comparatively little outlay on manufacturing and with little space being required and, in addition, requires relatively little accessibility space for the user for moving the connection body between its released position and its fastened position. For example, in combination with the aforementioned aspect of the invention, the connection body can be rotated by the user without a tool, or using a rotary tool requiring little space, from that side of the functional surface body which faces away from the base portion of the box housing body.

According to a further aspect of the invention, the connection device is configured for selective releasable fastening of the functional surface body in front of a front side or behind a rear side of the base portion of the box housing body. It is thereby possible in an advantageous manner to arrange the functional surface body either in front of the front side or behind the rear side of the base portion of the box housing body and to retain it in this position on the base portion. The flexibility in respect of the possibilities of using the functional surface body for providing, for example, a fastening surface or a sealing surface in selectively different axial positions relative to the base portion is therefore further increased. This applies especially also in respect of the possibility of arranging the connection box unit at different axial positions in or on a wall in the building and of installing same in the wall or attaching same to the wall.

It goes without saying that the above-mentioned aspects of the invention and the following developments in corresponding embodiments are realized in each case individually or in any combination, as also emerges from the wording of the patent claims.

Advantageous developments of the invention are specified in the dependent claims, the wording of which is hereby made part of the description by reference. This in particular also includes all of the embodiments of the invention that arise from the combinations of features which are defined by the dependency references in the dependent claims.

In a development of the invention, the at least one connection structure is a connection structure element disposed in the base portion of the box housing body. This has the advantage that the connection structure is provided specifically by the connection structure element in the base portion, and therefore the base portion can otherwise be kept free from the connection structure. Alternatively, the connection structure can be provided by a connection structure element disposed on the outer side of the base portion, or can be formed without such a connection structure element, for example directly on the base portion itself.

In a refinement of the invention, the connection structure element includes a sleeve element extending continuously through the base portion between a front side and a rear side of the base portion. This constitutes a realization of the connection structure element arranged in the base portion of the box housing body that is advantageous functionally and in terms of manufacturing.

The realization of the connection structure element as a sleeve element can be readily combined with a rotatable embodiment of the connection body and/or with accessibility of the connection body from that side of the functional surface body which faces away from the base portion. Since the sleeve element extends through the base portion between the front and rear side thereof, this realization of the connection structure element also provides a favorable prerequisite for embodying the connection device in such a manner that the functional surface body can be selectively fastened to the base portion in a manner lying either in front of the front side or behind the rear side of the base portion. In alternative embodiments, a different connection structure element is used, for example a sleeve element extending only from the front side or the rear side into the base portion, but not through the latter, or a similar element which is open only on one side and forms a type of blind hole opening and with which the functional surface body is fastened to the base portion only from the front side or only from the rear side of the base portion, or a fastening lug which is integrally formed on the base portion or is attached to the latter, or a snap-on region which is formed on the base portion.

In a development of the invention, the at least one connection structure includes a bolt mounting opening having an opening edge which includes a locking profile, and the connection body includes a connection bolt insertable into the bolt mounting opening and turnable within the bolt mounting opening between the released position and the fastened position, which bolt has a counter-locking profile on its peripheral side, wherein the locking profile and the counter-locking profile in the fastened position of the connection bolt cooperate in a locking manner to prevent axial removal of the connection bolt from the bolt mounting opening and in the released position of the connection bolt enable axial removal of the connection bolt from the bolt mounting opening.

This constitutes a realization of the connection device for releasably fastening the functional surface body to the base portion of the box housing body that is advantageous in terms of manufacturing and functionally for numerous applications of the connection box unit. For this purpose, use is made of a locking connection which, by turning of the connection bolt, which is fitted axially into the bolt mounting opening, within the bolt mounting opening, can be latched and locked or unlocked again and disengaged. Alternatively, the connection device is realized by another conventional locking connection or another type of connection, such as a screw connection.

In a refinement of the invention, the actuation interface of the connection body includes a tool interface on an end face of the connection bolt. The connection bolt can thus be turned at its relevant end face between its released position and its fastened position by means of a corresponding rotary tool. Alternatively, the actuation interface is realized in some other way, for example by direct user actuation without a tool interface or by a tool interface on the peripheral side of the bolt.

In a refinement of the invention, the locking profile includes one or more locking bars axially spaced from each other, which bars each extend within a locking bar circumferential sector of the bolt mounting opening, and the counter-locking profile includes one or more counter-locking bars axially spaced from each other, which bars each extend within a counter-locking bar circumferential sector. This constitutes a functionally advantageous realization of the locking profile and of the counter-locking profile cooperating therewith, the realization requiring relatively little outlay on production. The effect achieved by axially overlapping the locking bar or locking bars with the counter-locking bar or the counter-locking bars is the desired locking in the fastened position of the connection bolt, from which the latter can be unscrewed into the released position, in which there is no axial overlapping of the locking bars with the counter-locking bar, i.e. in which the locking bar circumferential sector does not axially overlap with the counter-locking bar circumferential sector.

In a refinement of the invention, only the locking profile beyond the locking bar circumferential sector or only the counter-locking profile beyond the counter-locking bar circumferential sector or both the locking profile beyond the locking bar circumferential sector and the counter-locking profile beyond the counter-locking bar circumferential sector include at least one snap-on bar within a snap-on bar circumferential sector. With the snap-on bar, the connection bolt can be fitted in an axially locking manner into the bolt mounting opening and retained pre-fixed therein at a respectively desired axial level. Such pre-fixing facilitates the subsequent turning of the connection bolt within the bolt mounting opening from the released position into the fastened position since, for this purpose, the connection bolt does not need to be held axially at a level by the user. In alternative embodiments, no axial snapping-on or pre-fixing is provided, or such is realized with other means, for example in the form of a magnetic pre-fixing which holds the connection bolt in the bolt mounting opening in a manner pre-fixed at different axial levels by means of an appropriately configured magnetic arrangement.

In a development of the invention, the sanitary wall installation connection box unit includes a captive securing element which retains the connection body captive on the functional surface body in the preassembled state. The connection body can thus be preassembled on the functional surface body without being lost before the functional surface body is then fastened to the base portion of the box housing body using the connection body. In alternative embodiments, the connection body is provided separately and only arranged on the functional surface body when the latter is fastened to the base portion of the box housing body.

In a development of the invention, the wall installation connection box unit includes an end position detent which locks the connection body in the fastened position on the functional surface body in an unlockable manner. This locking can prevent unintentional removal of the connection body from its end position corresponding to the fastened position. Alternatively, the connection box unit does not have such end position detent for the connection body.

In a development of the invention, the wall installation connection box unit includes a rotation lock element which includes corresponding end position stops on the connection body, on the one hand, and on the functional surface body or on the connection structure, on the other hand. The corresponding end position stops prevent an inadvertent or undesirable further rotation of the connection body relative to the functional surface body and to the connection structure beyond the fastened position or the released position of the connection body, if such connection body movement is a rotational movement. Alternative embodiments of the connection box unit lack such a rotation lock element.

In a development of the invention, the functional surface body includes a closed annular body with a sleeve portion passage opening and at least one connection body passage opening. In this realization, the functional surface body is suitable in particular for providing a functional surface extending radially around the sleeve portion of the box housing body, such as an annular fastening surface and/or an annular sealing surface. The functional surface body can be pushed here onto the sleeve portion of the box housing body, wherein the sleeve portion passes through the associated passage opening, and the connection body or the connection bodies can be passed through the associated connection body passage opening of the functional surface body for cooperation with the connection structure. In alternative embodiments of the connection box unit, the functional surface body is realized in some other way, for example as an open annular body or without a connection body passage opening, wherein, in the latter case, the connection body or the connection bodies is or are connected to the functional surface body in another conventional way, for example via another form-fitting mechanical connection, such as in the form of corresponding retaining catches on the connection body on the one hand and on the functional surface body on the other hand.

In a development of the invention, the sleeve portion and the base portion of the box housing body are integrally formed from a synthetic foamed material, wherein the connection structure is moulded to the base portion or the connection structure element is embedded into the synthetic foamed material of the base portion. This embodiment of the box housing body can advantageously be combined with the present realization of the connection device for releasably fastening the functional surface body to the base portion of the box housing body according to one or more of the aspects of the invention specified for this purpose. For example, provision can be made to form the connection structure on the base portion from said synthetic foamed material or to embed a connection structure element providing the connection structure into the synthetic foamed material of the base portion. In alternative embodiments, the sleeve portion and/or the base portion of the box housing body are/is composed of a synthetic material which is flexurally rigid, i.e. stiffer than synthetic foamed material. In this case, the connection structure element can optionally be composed of the same flexurally rigid synthetic material, or the connection structure can be realized without a component to be provided specifically for this purpose, as a structure which is integrated into the base portion of the box housing body.

Additional features and advantages of the present invention will become apparent to those skilled in the art upon consideration of the following detailed description of the illustrative embodiments best exemplifying the best mode of carrying out the invention as presently perceived.

BRIEF DESCRIPTION OF THE DRAWINGS

Advantageous exemplary embodiments of the invention are illustrated in the drawings. These and further illustrative embodiments of the invention will be described in more detail below. In the drawings:

FIG. 3 shows a top view from the front onto the connection box unit with the functional surface body attached to the front side of a base portion of the box housing body;

FIG. 4 shows a sectional view along a line Iv-Iv in FIG. 3;

FIG. 11 shows a perspective view of half of a connection structure element with a connection structure cooperating with the connection body;

FIG. 12 shows a perspective view of the connection structure element;

FIG. 13 shows the sectional view of FIG. 4 with the functional surface body in a different axial position; and FIG. 14 shows the sectional view of FIG. 4 with the functional surface body attached to the rear side of the base portion of the box housing body.

DETAILED DESCRIPTION OF THE DRAWINGS

Figure 1:
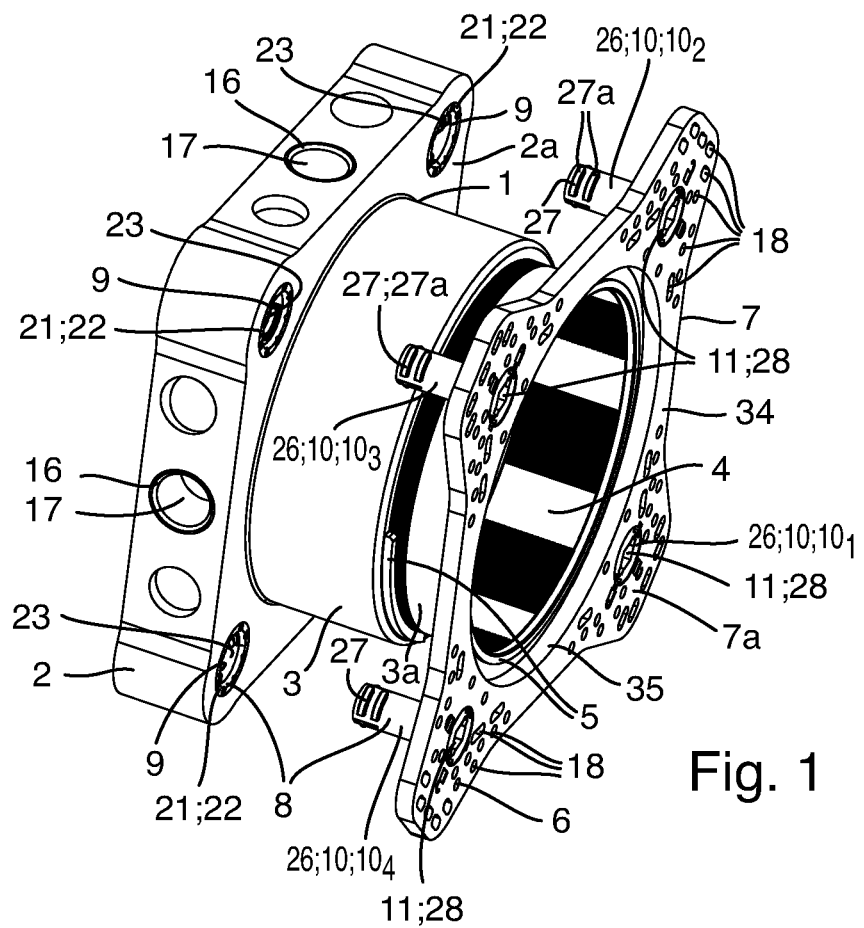
FIG. 1 shows a front-side perspective view of a sanitary wall installation connection box unit with a functional surface body separate from the box housing body.
Figure 2:
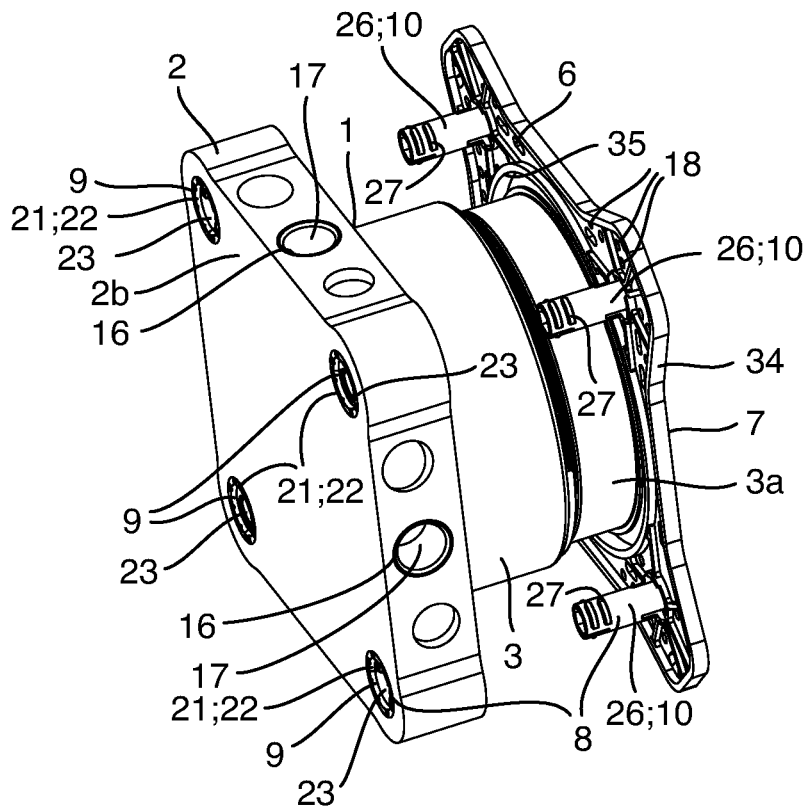
FIG. 2 shows a rear-side perspective view of the connection box unit with the functional surface body separate from the box housing body.

The embodiments of the invention described herein are not intended to be exhaustive or to limit the invention to precise forms disclosed. Rather, the embodiments selected for description have been chosen to enable one skilled in the art to practice the invention.

The wall installation connection box unit shown by way of example in the figures includes a box housing body 1 having a rear-side base portion 2 and a sleeve portion 3 projecting forward from the base portion 2, a functional surface body 7 which includes a functional surface 6, and a connection device 8 which is configured for releasable fastening of the functional surface body 7 to the base portion 2 in different axial levels of the functional surface 6. The connection device 8 includes at least one connection structure 9 on the base portion 2 radially outside the sleeve portion 3 and a connection body 10 cooperating with the connection structure 9, which connection body is arranged so as to be user-operable via an actuation interface 11 and to be movable relative to the connection structure 9 and to the functional surface body 7 between a released position 12 and a fastened position 13.

In the example shown, the connection device 8 includes a plurality of connection structures 9 and correspondingly a plurality of connection bodies 10, wherein FIGS. 3 and 4 for illustrative purposes show a first connection body 10₁ in the fastened position 13 and a second connection body 10₂ in the released position 12. In other words, in this example, the connection structure 9 and the connection body 10 each respectively includes a plurality of separate individual connection structures or individual connection bodies. The connection box unit in the embodiment shown specifically includes four identical connection bodies 10, i.e. a third and a fourth connection body 10₃, 10₄ in addition to the first and second connection bodies 10₁, 10₂ and correspondingly four identical connection structures 9.

The wall installation connection box unit shown can be configured in particular as a sanitary wall installation connection box unit for connecting sanitary components to water conduit connections in the building, as explained at the beginning, wherein the sleeve portion 3 of the box housing body 1 peripherally surrounds an installation component mounting space 4 which is then configured as a sanitary component mounting space and is accessible via an open front end face 5 of the sleeve portion 3, via which the installation component, such as a sanitary component, can be introduced into the box housing body 1. In alternative embodiments, not shown, the wall installation connection box unit is configured as an electrical wall installation connection box unit for connecting electrical components to electrical conduit connections in the building, as likewise explained at the beginning, wherein the installation component mounting space 4 then forms an electrical component mounting space into which the relevant electrical component can be introduced into the box housing body 1 via the open front end face 5 of the sleeve portion 3. In corresponding embodiments, as in the example shown, the open front end face 5 of the sleeve portion 3 is at the same time also the open front end face 5 of an optional extension sleeve 3a held and guided on the sleeve portion 3 so as to be adjustable in level axially.

A connector body 14 which is arranged or held in the base portion 2 acts as a fluid- or conduit-connecting link, the connector body 14 having an installation component connection contour 15 facing the installation component mounting space 4, i.e., in the sanitary case, a sanitary component connection contour and, in the electrical case, an electrical component connection contour, a conduit connection interface structure 16 accessible on an outer side of the box housing body 1, i.e., in the sanitary case, a fluid conduit connection interface structure and, in the electrical case, an electrical conduit connection interface structure, and, in the sanitary case, a fluid channel structure 17 for fluidly connecting the fluid conduit connection interface structure 16 to the sanitary component connection contour 15, and, in the electrical case, an electrically conductive connection of the electrical conduit connection interface structure on the outer side of the box to the electrical component connection contour on the inner side of the box, as can be seen in particular from FIGS. 1 to 4, 13 and 14. Connection bodies with such functional components for use in sanitary and electrical installation technology are known per se to a person skilled in the art and thus do not need to be discussed in more detail here.

The functional surface 6 of the functional surface body 7 provides a surface which, in the example shown fulfils a fastening function, by means of which the functional surface body 7 and thus the box housing body 1, to the base portion 2 of which the functional surface body 7 can be releasably fastened, can be fastened to a wall in the building. In the example shown, this fastening function of the functional surface 6 is assisted by a plurality of fastening openings 18 with which the functional surface 6 or the functional surface body 7 is provided. Alternatively, the functional surface body 7 can be designed in such a manner that, with its functional surface 6, it fulfils both a fastening function and a sealing function or only a sealing function.

Via the actuation interface 11, the user can move the respective connection body 10 between the released position 12 and the fastened position 13 and thereby fasten the functional surface body 7 to the base portion 2 of the box housing body 1 or enable same again to release it. The actuation interface 11 is configured for corresponding actuation by the user.

In an advantageous embodiment aspect of the connection box unit, the actuation interface 11 of the connection body 10, as in the exemplary embodiment shown, is located on a side 7a of the functional surface body 7 facing away from the base portion 2 of the box housing body 1. This makes it possible for the user to actuate the movement of the connection body 10 unobstructed by the base portion 2 from this side 7a which is usually still accessible to the user even if the connection box unit is already in the mounting position on or in a housing wall.

In a further advantageous embodiment aspect of the invention, the connection body 10, as in the exemplary embodiment shown, is rotatable between the released position 12 and the fastened position 13. Optionally, as in the example shown, the released position 12 is symbolized by the figurative representation of a swivelled-out lock 19a and the fastened position 13 by the figurative representation of a swivelled-in lock 19b on the functional surface body 7 adjacent to the respective connection body 10 at marking positions at which a corresponding rotational position marking 20 of the connection body 10 is located in the released position 12 and in the fastened position 13 respectively, as explicitly indicated in FIG. 3. This makes it easier for the user to see the position in which the connection body 10 is currently located.

In a further advantageous embodiment aspect of the invention, the connection device 8, as in the exemplary embodiment shown, is configured for selective releasable fastening of the functional surface body 7 in front of a front side 2a or behind a rear side 2b of the base portion 2 of the box housing body 1. In the views of FIGS. 4 and 13, the fastening of the functional surface body 7 is shown in front of the front side 2a, and, in the view of FIG. 14, the fastening of the functional surface body 7 is shown behind the rear side 2b of the base portion 2 of the box housing body 1. Specifically, FIG. 4 shows a front-side mounting of the functional surface body 7 directly on the front side 2a of the base portion 2, i.e. with a minimum axial zero spacing from the base portion 2 forwards, and FIG. 13 shows a front-side mounting of the functional surface body 7 with a by comparison greater axial spacing from the base portion 2 forwards, while FIG. 14 shows a rear-side mounting of the functional surface body 7 with approximately the same axial spacing from the base portion 2, as shown rearwards in FIG. 13.

Furthermore, in the example shown, a plurality of other mounting positions, not shown, for the functional surface body 7 in staggered different axial levels with respect to the box housing body 1 are also possible by appropriately designing the connection device 8. In appropriate embodiments, depending on requirements, the connection device 8 can be configured for continuous or, as in the example shown, multi-step adjustability of the axial level of the functional surface body 7 with respect to the box housing body 1. The connection device 8, as in the example shown, is preferably designed in such a manner that the functional surface body 7 both when mounted on the front side and on the rear side of the box housing body 1 can be fastened in each case in a plurality of different axial levels of its functional surface 6 to the base portion 2; in alternative embodiments, it can be fastened only in one single axial level when mounted on the rear side or on the front side.

While, in the exemplary embodiment shown, the aspects of the invention that the actuation interface 11 of the connection body 10 is located on that side 7a of the functional surface body 7 facing away from the base portion 2, that the connection body 10 is rotatable between the released position 12 and the fastened position 13, and that the connection device 8 is configured for selective fastening of the functional surface body 7 on the front side or rear side of the base portion 2, are all realized in combination; in alternative embodiments only one or two of these aspects of the invention are realized. This is possible in a simple manner since these aspects do not necessarily define one another although a combination of two or all three aspects can lead to specific advantages. For example, in appropriate alternative embodiments of the invention, the actuation interface 11 of the connection body 10 is located on a side of the functional surface body 7 facing the base portion 2 of the box housing body 1, or radially on the outside laterally with respect to the base portion 2, and/or the connection body 10 is movable in a purely translational manner between the released position 12 and the fastened position 13, for example only axially or axially and radially in combination, and/or the connection device 8 is designed in such a manner that the functional surface body 7 can be fastened only to the front side or only to the rear side of the base portion 2.

In corresponding embodiments, the at least one connection structure 9 or the respective connection structure 9, as in the example shown, is a connection structure element 21 disposed in the base portion 2 of the box housing body 1. In alternative embodiments, the connection structure 9 can be moulded, for example directly, onto the base portion 2.

In advantageous embodiments, the connection structure element 21, as in the example shown, includes a sleeve element 22 extending continuously through the base portion 2 between the front side 2a and the rear side 2b of the base portion 2 of the box housing body 1, as can be seen in particular from FIGS. 1, 2, 4 and 11 to 14. Alternatively, the connection structure element 21 can include, for example, a connection stub protruding forward from the front side 2a of the base portion 2 of the box housing body 1 and/or rearward from the rear side 2b of the base portion 2, on which connection stub the connection structure 9 is formed.

In corresponding embodiments, the at least one connection structure 9, as in the exemplary embodiment shown, includes a bolt mounting opening 23 having an opening edge 25 which includes a locking profile 24, as can be seen in particular from FIGS. 4 and 11 to 14. Corresponding thereto, the connection body 10 in this case includes a connection bolt 26 insertable into the bolt mounting opening 23 and turnable within the bolt mounting opening 23 between the released position 12 and the fastened position 13, which bolt has a counter-locking profile 27 on its peripheral side, as can be seen in particular from FIGS. 1, 2, 4, 7 to 10, 13 and 14. The locking profile 24 and the counter-locking profile 27 in the fastened position 13 of the connection bolt 26 cooperate in a locking manner to prevent axial removal of the connection bolt 26 out of the bolt mounting opening 23 and in the released position 12 of the connection bolt 26 enable axial removal of the connection bolt 26 out of the bolt mounting opening 23. In alternative embodiments, for example in a technical reversal, the respective connection structure 9 can be in the form of a connection stub or connection bolt in the manner of the connection bolt 26 and the respective connection body 10 can be formed with a stub or bolt mounting opening in the manner of the bolt mounting opening 23.

In appropriate embodiments, the actuation interface 11 of the connection body 10, as in the example shown, includes a tool interface 28 on an end face of the connection bolt 26. Depending on requirements, the tool interface 28 is provided only on one end face, or, as in the example shown, on both end faces, of the connection bolt 26. Specifically, in the example shown, the tool interface 28 is formed by a polygonal opening, such as a conventional hexagon socket opening, extending continuously through the connection bolt 26 between the two end faces, into which, via each of the two end faces, a suitable polygonal rotary tool, for example a screw driver or a hexagon key, can be inserted in order to turn the connection bolt 26 within the bolt mounting opening 23.

In appropriate embodiments, the locking profile 24, as in the example shown, includes one or more locking bars 24a axially spaced from each other, which bars each extend within a locking bar circumferential sector $U_R$ of the bolt mounting opening 23. Corresponding thereto, the counter-locking profile 27 in this case includes one or more counter-locking bars 27a axially spaced from each other, which bars each extend within a counter-locking bar circumferential sector UG. Specifically, in the example shown, the locking profile 24 in each case includes six locking bars 24a axially spaced from each other on two opposite circumferential sector regions $U_{R1}$, $U_{R2}$, which bars each extend over a circumferential angular region of approximately 60° to 90° and together form the locking bar circumferential sector UR, while, corresponding thereto, the counter-locking profile 27 in each case includes two counter-locking bars 27a axially spaced from each other on two opposite, outer circumferential sector regions $U_{G1}$, $U_{G2}$, which together form the counter-locking bar circumferential sector UG and each extend over a circumferential angular region of approximately 60° to 90°.

In the example shown, for mounting the functional surface body 7 on the base portion 2 of the box housing body 1, the respective connection bolt 26, in its released-position rotational position corresponding to the released position 12, can thus be fitted axially into the bolt mounting opening 23 of the associated sleeve element 22, with the counter-locking bars 27a moving axially past the locking bars 24a in the two circumferential angular regions between the circumferential sector regions $U_{R1}$, $U_{R2}$. As soon as the connection bolt 26 is located in the desired axial level, it is rotated about an associated fastening angle of, for example, 60° to 90° from the released position 12 into the fastened position 13, wherein the counter-locking bars 27a move axially into the intermediate spaces between the locking bars 24a and thereby cooperate in a locking and securing or locking manner against axial movements of the connection bolt 26 within the bolt mounting opening 23.

In alternative embodiments, the locking profile 24 includes only one or between two and five or more than six locking bars 24a axially spaced apart, and/or the counter-locking profile 27 includes only one or more than two counter-locking bars 27a axially spaced from each other. When required, provision can be made to provide a plurality of sleeve elements 22 of different axial length and/or a plurality of connection bolts 26 of different axial length in order then to select in each case a suitable sleeve element 22 or a suitable connection bolt 26 depending on the axial level desired in the specific case of the functional surface 6 of the functional surface body 7 to be mounted on the base portion 2.

In advantageous embodiments, the latching profile 24 beyond the locking bar circumferential sector $U_R$ and/or the counter-locking profile 27 beyond the counter-locking bar circumferential sector $U_G$ includes at least one snap-on bar 29 within a snap-on bar circumferential sector $U_A$. Specifically, in the example shown, the counter-locking profile 27 formed on the connection bolt 26 includes in each case one snap-on bar 27b within each of two opposite snap-on bar circumferential sector regions $U_{A1}$, $U_{A2}$, which together form the snap-on bar circumferential sector $U_A$ and in each case extend in one of the two circumferential angular regions between the two counter-locking bar circumferential sector regions $U_{G1}$, $U_{G2}$, as can be seen in particular from FIGS. 7, 9 and 10.

When the connection bolt 26 in its released-position rotational position is fitted axially into the bolt mounting opening 23, the snap-on bar circumferential sector $U_A$ overlaps with the locking-bar circumferential sector $U_R$, and therefore the snap-on bar 27b snaps onto the locking profile 24 in a manner yielding radially spring-elastically, i.e. locks along the axial row of locking bars 24a of said locking profile until the connection bolt 26 has reached a desired axial level and the user stops pushing the connection bolt 26 forward axially. The snap-on bar 27b, in cooperation with the two in each case axially adjacent locking bars of the relevant axial row of locking bars 24a, then pre-fixes the connection bolt 26 in this axial position, and the user can rotate the connection bolt 26 from the released position 12 into the fastened position 13 without having to hold it in its axial position by hand. In the fastened position 13, it is then fixed, as explained, by cooperation of the locking bars 24a with the counter-locking bars 27 in the axial direction in the bolt mounting opening 23.

Analogously, the connection bolt 26, after being rotated back into its released position 12 by the user for release or for the purpose of axial adjustment of the level, can be removed axially out of the bolt mounting opening 23 or can move further into the latter, with the snap-on bar 27b in the two axial directions of movement cooperating with the locking bars 24a in a manner yielding radially spring-elastically and thereby permitting this movement in both directions without blocking it.

Figure 5:
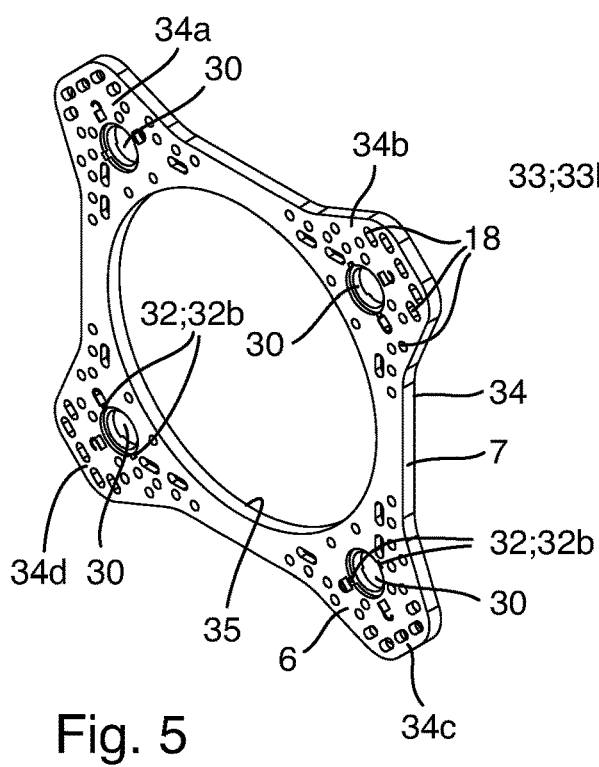
FIG. 5 shows a front-side perspective view of the functional surface body.
Figure 6:
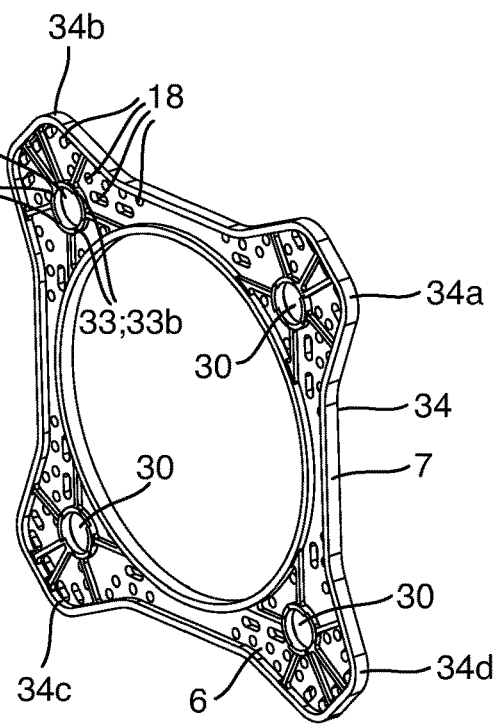
FIG. 6 shows a rear-side perspective view of the functional surface body.
Figure 7:
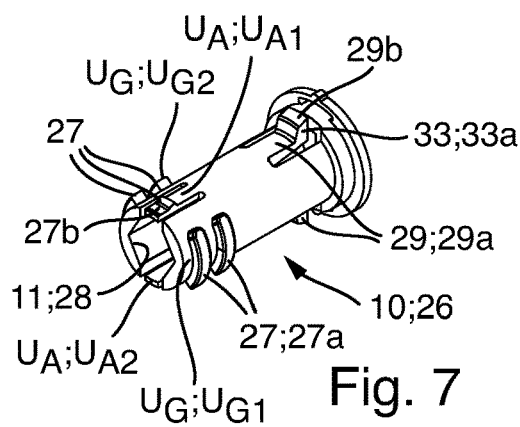
FIG. 7 shows a perspective view of a connection body of a connection device for releasably fastening the functional surface body to a base portion of the box housing body of the connection box unit of FIG. 1.
Figure 8:
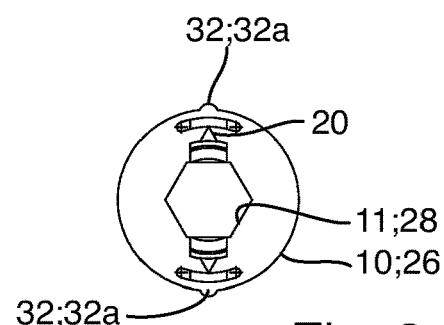
FIG. 8 shows a front view of the connection body.
Figure 9:
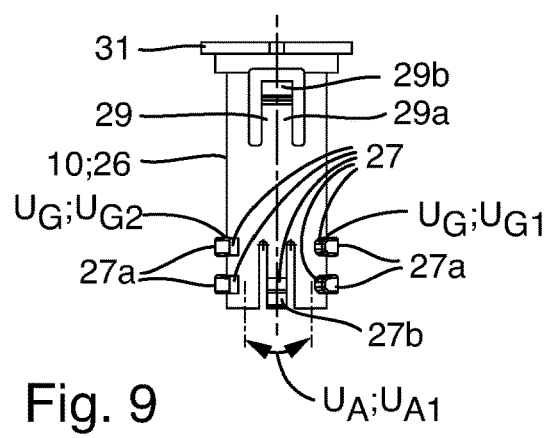
FIG. 9 shows a side view of the connection body.
Figure 10:
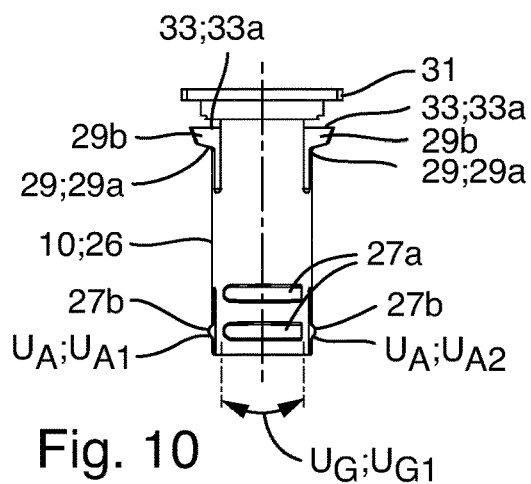
FIG. 10 shows a side view of the connection body rotated by 90° in relation to FIG. 9.

In appropriate embodiments, the connection box unit, as in the example shown, includes a captive securing element 29 which retains the connection body 10 captive on the functional surface body 7 in the preassembled state. In the example shown, the captive securing element 29 includes two locking spring tongues 29a that are formed on the connection bolt 26 peripherally on opposite sides and each have a radially outwardly protruding locking cam 29b, as can be seen in particular from FIGS. 7, 9 and 10. The locking cams are configured for engaging behind an opening edge of a connection body passage opening 30, which is formed on the functional surface body 7, in order to be able to insert the connection body 10 through said opening, as can be seen in particular from FIGS. 5 and 6. The connection body 10 or the connection bolt 26 with a widened head part 31 on the front side comes to bear against the edge of the connection body passage opening 30 and locks behind said opening edge with the locking cams 29b that yield spring-elastically in the radial direction. As a result, the connection body 10 or connection bolt 26 is retained captive on the functional surface body 7 loosely and rotatably in the preassembled state.

In advantageous embodiments, the connection box unit, as in the example shown, includes an end position detent 32 which locks the connection body 10 or connection bolt 26 in the fastened position 13 on the functional surface body 7 in an unlockable manner. Specifically, in the example shown, the end position detent 32 includes two locking lugs 32a formed peripherally on the head part 31 of the connection bolt 26 and two corresponding locking recesses 32b on the opening edge of the respective connection body passage opening 30 of the functional surface body 7, as can be seen in particular from FIGS. 5 and 8. The end position detent 32 prevents an unintentional passing or rotation back of the connection bolt 26 out of the fastened position 13 in the direction of the released position 12. On the other hand, the end position detent 32 is configured in such a manner that the connection body 10 or connection bolt 26 can be unlocked by the user by means of a small rotational force if the user wants to bring the connection body 7 or connection bolt 26 from its fastened position 13 into its released position 12.

In advantageous embodiments, the connection box unit, as in the exemplary embodiment shown, includes a rotation lock element 33 which includes corresponding end position stops 33a, 33b on the connection body 10 or connection bolt 26, on the one hand, and on the functional surface body 7 or on the connection structure 9, on the other hand. In the example shown, the rotation lock element 33 firstly includes stop lugs 33a on the connection bolt 26, wherein the stop lugs 33a can preferably be formed by the latching cams 29b, and, secondly, opening edge catches 33b on the opening edge of the respective connection body passage opening 30 of the functional surface body 7, against which catches the respective stop lug 33a comes to bear when the connection bolt 26 is rotated into its release position 12 or into its fastened position 13.

In corresponding embodiments, the functional surface body 7, as in the example shown, includes a closed annular body 34 with a sleeve portion passage opening 35 and the already mentioned at least one connection body passage opening 30, as can be seen in particular from FIGS. 1 to 3, 5 and 6. For the installation, the annular body 34 is pushed from the front onto the box housing body 1, with the sleeve portion 3 thereof being able to pass through the sleeve portion passage opening 35 such that the annular body 34 surrounds the sleeve portion 3 in a closed manner. In the example shown, the annular body 34 has four connection body passage openings 30 in a peripheral angular spacing of in each case approximately 90°, wherein the annular body 34 is provided in the relevant regions with extensions 34a, 34b, 34c, 34d which extend radially outwards and in which the fastening openings 18 already mentioned above are also formed.

In appropriate embodiments, as in the example shown, the sleeve portion 3 and the base portion 2 of the box housing body 1 are integrally formed from a synthetic foamed material, wherein the connection structure 9 is moulded to the base portion or the connection structure element 21 is embedded into the synthetic foamed material of the base portion 2. In particular, during the production of the box housing body, the sleeve element 22 can be embedded in a single manufacturing process into the synthetic foamed material of the base portion 2 or encapsulated peripherally by said synthetic foamed material. For this purpose, it can be useful to pre-manufacture the sleeve element 22 from two half shells, of which one is shown separately in FIG. 11, and to join the two half shells together to form the sleeve element 22 before the latter is then embedded into the synthetic foamed material. In alternative embodiments, the box housing body 1 is not composed of a synthetic foamed material, but rather, for example, of a synthetic material which is stiffer by comparison.

In this and also in other cases, the sleeve element 22 or the connection structure element 21 can be formed, for example, from a hard, flexurally rigid synthetic material or a metal material. If the base portion 2 of the box housing body 1 is formed from a stiff synthetic or metal material, the connection structure 9 can also be realized directly as a structure which is integrated into the base portion 2. Similarly, the connection body 10 and the functional surface body 7 can be formed from any synthetic or metal material, depending on requirements and application. The same is true of the connector body 14.

As the exemplary embodiments which have been shown and which have been explained further above make clear, the invention provides a wall installation box connection unit that affords particular functional advantages and/or advantages in respect of the outlay on manufacturing and/or installation, especially as far as the flexible usability of the connection box unit because of being able to variably fasten the functional surface body to the box housing body and/or the realization of the connection device for releasably fastening the functional surface body to the base portion of the box housing body are concerned.

The connection box unit can be used particularly advantageously as a sanitary wall installation connection box unit in sanitary installation technology and as an electrical wall installation connection box unit in electrical installation technology in conjunction with the installation of sanitary or electrical components, whether in a design mounted flush or on the surface, on a side, top or bottom wall of a sanitary space or of a kitchen or of another space or room in a building.

Although the invention has been described in detailed with reference to preferred embodiments, variations and modifications exist within the spirit and scope of the invention as described and defined in the following claims.

The invention claimed is:

1. A wall installation connection box unit, comprising:
a box housing body having a rear-side base portion and a sleeve portion projecting forward from the base portion, which sleeve portion peripherally surrounds an installation component mounting space, which installation component mounting space is accessible via an open front end face of the sleeve portion;
a functional surface body including a functional surface; and
a connection device which is configured for releasable fastening of the functional surface body to the base portion in different axial levels of the functional surface, and comprises at least one connection structure on the base portion radially outside the sleeve portion and a connection body cooperating with the connection structure, which connection body is user-operable via an actuation interface to be movable relative to the connection structure and to the functional surface body between a released position and a fastened position;
wherein:
the actuation interface of the connection body is located on a front side of the functional surface body positioned opposite the base portion of the box housing body whereby the actuation interface remains accessible after positioning the connection box unit in a wall opening, or
the connection body is rotatable between the released position and the fastened position, or
the connection device is configured for selective releasable fastening of the functional surface body in a first position and a second position, wherein, in the first position, the functional surface body is in front of a front side and, in the second position, the functional surface body is behind a rear side of the base portion of the box housing body whereby the wall installation connecting box unit can be installed with the functional surface body fastened in the first position or in the second position.

2. The wall installation connection box unit according to claim 1, wherein the at least one connection structure is a connection structure element disposed in the base portion of the box housing body.

3. The wall installation connection box unit according to claim 2, wherein the connection structure element includes a sleeve element extending continuously through the base portion between a front side and a rear side of the base portion.

4. The wall installation connection box unit according to claim 1, wherein the at least one connection structure includes a bolt mounting opening having an opening edge which includes a locking profile, and the connection body includes a connection bolt insertable into the bolt mounting opening and turnable within the bolt mounting opening between the released position and the fastened position, which bolt has a counter-locking profile on its peripheral side, wherein the locking profile and the counter-locking profile in the fastened position of the connection bolt cooperate in a locking manner to prevent axial removal of the connection bolt from the bolt mounting opening and in the released position of the connection bolt enable axial removal of the connection bolt from the bolt mounting opening.

5. The wall installation connection box unit according to claim 4, wherein the actuation interface of the connection body includes a tool interface on an end face of the connection bolt.

6. The wall installation connection box unit according to claim 4, wherein the locking profile includes one or more locking bars axially spaced from each other, which locking bars each extend within a locking bar circumferential sector of the bolt mounting opening, and the counter-locking profile includes one or more counter-locking bars axially spaced from each other, which bars each extend within a counter-locking bar circumferential sector.

7. The wall installation connection box unit according to claim 4, wherein at least one of the locking profile beyond the locking bar circumferential sector and the counter-locking profile beyond the counter-locking bar circumferential sector include at least one snap-on bar within a snap-on bar circumferential sector.

8. The wall installation connection box unit according to claim 1, further comprising at least one of:
- a captive securing element which retains the connection body captive on the functional surface body in the preassembled state;
- an end position detent which locks the connection body in the fastened position on the functional surface body in an unlockable manner; and
- a rotation lock element which comprises corresponding end position stops on the connection body, on the one hand side, and on the functional surface body or on the connection structure, on the other hand side.

9. The wall installation connection box unit according to claim 1, wherein the functional surface body includes a closed annular body with a sleeve portion passage opening and at least one connection body passage opening.

10. The wall installation connection box unit according to claim 1, wherein the sleeve portion and the base portion of the box housing body are integrally formed from a synthetic foamed material, the connection structure being molded to the base portion or the connection structure being embedded into the synthetic foamed material of the base portion.

11. The wall installation connection box unit according to claim 1, wherein the actuation interface of the connection body is located on a front side of the functional surface body positioned opposite the base portion of the box housing body whereby the actuation interface remains accessible after positioning the connection box unit in a wall opening.

12. The wall installation connection box unit according to claim 1, wherein the connection body is rotatable between the released position and the fastened position.

13. The wall installation connection box unit according to claim 1, wherein the connection device is configured for selective releasable fastening of the functional surface body in a first position and a second position, wherein, in the first position, the functional surface body is in front of a front side and, in the second position, the functional surface body is behind a rear side of the base portion of the box housing body whereby the wall installation connecting box unit can be installed with the functional surface body fastened in the first position or in the second position.

* * * * *